3,420,864
PHOSPHORUS AND ARSENIC TRI-IMIDE
METAL COMPOUNDS
Jean G. Riess, Brentwood, and John R. Van Wazer, Ladue,
Mo., assignors to Monsanto Company, St. Louis, Mo.,
a corporation of Delaware
No Drawing. Filed Apr. 18, 1966, Ser. No. 543,022
U.S. Cl. 260—439                          23 Claims
Int. Cl. C07f 9/06; C07f 9/70; C101 1/30

ABSTRACT OF THE DISCLOSURE

The present invention relates to new chemical compounds and the process for their preparation. The compounds embody a phosphorus tri-imide or an arsenic tri-imide moiety combined with metal complexes in a very stable form. The compounds have utility as gasoline additives, anti-knock compounds and catalysts.

---

The present invention relates to new chemical compounds, and the process for making such compounds.

It is an object of the invention to provide new chemical compounds which embody a phosphorus tri-imide moiety $P_4(NR)_6$ or an arsenic tri-imide moiety $As_4(NR)_6$, combined with metal complexes in a very stable form.

The most general formula for the compounds of the present invention is expressed as:

$$Q_4(NR)_6[ML_a]_m[M'R'_b]_n$$

where Q is selected from the class consisting of phosphorus and arsenic. These two general cmopounds thus have the formulas:

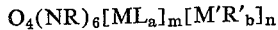
and

where R is a hydrocarbyl radical of from 1 to 6 carbon carbon atoms, for example an alkyl or aryl radical exemplified by methyl, ethyl, propyl, isopropyl, butyl, pentyl, cyclohexyl and phenyl radicals. In order to simplify the description of the invention, the methyl group is shown in detail as a representative member. In the above formula, M is at least one metal selected from the group consisting of nickel, cobalt, iron, manganese, chromium, vandaium, titanium, palladium, rhodium, ruthenium, molybdenum, platinum, iridium, osmium, rhenium, and tungsten (including mixed compounds which have more than one metal); L is a coordinating ligand selected from the group consisting of at least one of CO, $PF_3$, $PCl_3$, $PBr_3$, $PR''_3$, $P(OR'')_3$, $AsR''_3$, NCO, CN and unsaturated ligands such as cyclopentadiene, butadiene and other dienes, acetylene, benzene, biphenyl and naphthalene; R'' is a hydrocarbyl radical of from 1 to 20 carbon atoms including alkyl, for example, methyl, decyl or nonadecyl; cycloalkyl, for example, cyclohexyl; aryl, for example, phenyl or naphthyl; and alkylaryl, for example, the tolyl radical; $a$ is a whole number from 1 to 6, and $m$ is a whole number from 0 to 4.

In addition to the coordinating ligands discussed above, other additive substituents may be present on the metal, although not necessarily participating in the reaction with $P_4(NR)_6$ or $As_4(NR)_6$. Such additive substituents include halogens, for example fluorine, chlorine, bromine and iodine; hydrocarbyl radicals of from 1 to 20 carbon atoms, for example, alkyl groups such as methyl, ethyl, propyl, butyl up to eicosyl radicals and their isomers, and unsaturated analogues; aryl groups, for example, benzene, naphthalene; hydrogen; and water e.g. as hydrides and hydrates.

A given metal may have several coordination numbers as exemplified by iron in the compounds $Fe(CO)_5$, $Fe_2(CO)_9$, and $Fe_3(CO)_{12}$ or may be used in oxidation states other than zero, for example in the compounds $Co^{II}(CN)_5{}^{3-}$ and $HCo^{III}(CN)_5{}^{3-}$.

In the above formula, M' is at least one metal selected from the group consisting of beryllium, boron, aluminum, gallium, indium and thallium, with a preferred group being Group III metals, namely boron, aluminum, gallium, indium and thallium, and a most preferred group being boron and aluminum, including mixed compounds which have more than one metal; R' is at least one substituent of the metal, and is selected from the group consisting of hydrogen, a halogen, for example fluorine, chlorine, bromine or iodine; hydrocarbyl radicals of from 1 to 20 carbon atoms, for example, alkyl radicals having straight chain and branched chain structures including methyl, ethyl, propyl, n-butyl, isobutyl, sec-butyl, tert-butyl, cyclobutyl, decyl, and nonadecyl radicals; aryl and alkylaryl radicals, for example, phenyl, tolyl, benzyl, and isopropylphenyl groups; alkoxyl radicals of from 1 to 20 carbon atoms, for example, the methoxy, butoxy and decoxy groups; and aroxyl radicals of from 7 to 20 carbon atoms, for example, the phenoxy and naphthoxy groups. The R' may be the same or different radicals; $b$ represents the number of R' substitutents necessary to balance the valence of M' (typically equal to 3), and the symbol $n$ is a whole number from 0 to 4, and $n + m$ is a whole number from 1 to 4.

The starting compounds and radicals employed with the $P_4(NCH_3)_6$, or other compound within the general formula $Q(NR)_6$, in the practice of the present invention have the general formula $MR_b$ where Q, M, R, and $b$ are as set forth above. In the examples shown below, diborane $B_2H_6$ is used as a precursor material for the borane radical —$BH_3$ which comes under the above general formula $MR_b$. Other boranes may also be used as precursors or starting materials. The Group III component may furthermore be supplied as a complex, for example, $(C_2H_5)_2S \cdot BH_3$ or $PF_3 \cdot BH_3$ or $CO \cdot BH_3$.

In a preferred embodiment of the invention, it has been found that phosphorus tri-N-methylimide, $P_4(NCH_3)_6$, and arsenic tri-N-methylimide, $As_4(NCH_3)_6$, can react in either of two ways:

(A) Replace ligands in transition metal complexes, for example, $Ni(CO)_4$ in which one carbonyl group may be replaced by one $P_4(NCH_3)_6$ moiety or one $As_4(NCH_3)_6$ moiety, or (B) Add Lewis acids, e.g. a compound which has a low lying orbital which it has not yet used in bonding, owing to a shortage of electrons, to give new compounds in which transition elements and Group III elements are situated at the corners of a large tetrahedral structure. The new compounds are obtained by addition of Lewis acids or precursors thereof, for example, compounds of Group III elements, such as diborane, with phosphorus tri-N-methylimide or arsenic tri-N-methylimide, and by ligand-displacement reactions of phosphorus tri-N-methylimide or arsenic tri-N-methylimide with various transition metal complexes, for example, carbonyls to give compounds having a three-dimensional molecular form. These compounds all involve an elaborated bird-cage molecular structure, which provides a complex having metal-phosphorus bonds wherein metal atoms are also bridged by

and

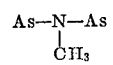

linkages. The generic formulas for these compositions are:

$$P_4(NCH_3)_6[ML_a]_m[M'R'_b]_n$$

and $$As_4(NCH_3)_6[ML_a]_m[M'R'_b]_n$$

where the symbols in the formulas are the same as above, but in which R is $CH_3$.

Examples of compounds coming under these formulas include:

$$P_4(NCH_3)_6[Ni(CO)_3]_2[BH_3]$$

$$As_4(NCH_3)_6[Fe(CO)_4]$$

and $$P_4(NCH_3)_6[BH_3]_3$$

In a more specific embodiment of the invention embracing the mixed compounds having both a transition metal component and a Group II or Group III component, the preceding formula has the limitation that $n$ is a whole number from 1 to 3, $m$ is a whole number from 1 to 3, $n$ plus $m$ is equal to a number from 2 to 4. An example of a compound coming under this formula is:

$$P_4(NCH_3)_6[Ni(CO)_3]_2[BH_3]_2$$

Another specific embodiment of the invention comprises the compounds where the preceding formula has the limitation that $m$ is a whole number from 1 to 4 and $n$ is zero. Such a group is described by the formulas:

$$P_4(NCH_3)_6[ML_a]_m$$

and $$As_4(NCH_3)_6[ML_a]_m$$

Examples of compounds coming under these formulas are:

$$P_4(NCH_3)_6[Fe(CO)_4]$$

$$P_4(NCH_3)_6[Co(CO)_4]_2$$

and $$As_4(NCH_3)_6[Ni(CO)_3]_4$$

Other specific formulas within the present generic formula are shown below, utilizing nickel as a representative metal, which is combined with carbonyl as a representative ligand. Such compounds within this group are described by the formulas:

$$P_4(NCH_3)_6[Ni(CO)_3]_m$$

and $$As_4(NCH_3)_6[Ni(CO)_3]_m$$

where $m$ is a whole number from 1 to 4. Still another specific embodiment of the invention comprises the compounds where the preceding formula has the limitation that $n$ is a whole number from 1 to 4 and $m$ is zero. Such a group is described by the formulas:

$$P_4(NCH_3)_6[M'R'_b]_n$$

and $$As_4(NCH_3)_6[M'R'_b]_n$$

Examples of compounds coming under these formulas are:

$$P_4(NCH_3)_6[BH_3]_4$$

and $$As_4(NCH_3)_6[B(CH_3)_3]_2$$

Other specific formulas within the present generic formulas are shown below, utilizing boron as a representative Group III metal, which is combined with hydrogen as a representative substituent. Such a compound is described by the formula:

$$P_4(NCH_3)_6[BH_3]_n$$

where $n$ is a whole number from 1 to 4; for example when $n=4$, the compound is P,P',P'',P'''-tetrakisborane (tetraphosphorus hexa-N-methylimide).

The preferred method of preparation of the compounds of the present invention is to mix together phosphorus tri-N-methylimide or arsenic tri-N-methylimide with the complex previously formed between the metal, M, and the ligands L, and the Group III compound, using the approximate stoichiometric proportions of the said phosphorus or arsenic compounds, the M–L complex and the Group III compound to obtain the desired molecular structure in maximum or near maximum yield. An example of this method of obtaining mixed compounds is the reaction of the phosphorus tri-N-methylimide or the arsenic tri-N-methylimide with the above Group III compounds, for example $B_2H_6$ and the transition metal complexes, for example nickel carbonyl.

The present reaction may also be conducted by using various $P_4(NCH_3)_6$-Group III complexes or $As_4(NCH_3)_6$-Group III complexes as starting materials to be reacted with the transition metal complex. For example, $P_4(NCH_3)_6[BH_3]_2$ may be reacted with $Ni(CO)_4$ to give such intermediate products as $$P_4(NCH_3)_6[Ni(CO)_3][BH_3]_2$$

$$P_4(NCH_3)_6[Ni(CO)_3]_2[BH_3]_2$$

and $P_4(NCH_3)_6[Ni(CO)_3]_3[BH_3]$ or the completely substituted $P_4(NCH_3)_6[Ni(CO)_3]_4$.

Similar intermediate products can be obtained by reacting the $P_4(NCH_3)_6$-transition metal complexes with Group III compounds. For example $$P_4(NCH_3)_6[Ni(CO)_3]_2$$

reacts with $B_2H_6$ to give $$P_4(NCH_3)_6[Ni(CO)_3]_2[BH_3]$$

and other analogous compounds.

The use of an excess of either the phosphorus or arsenic tri-N-methylimide or the metal component aids in carrying the reaction towards definite compounds. For example, when $Ni(CO)_4$ is reacted with an excess of $As_4(NCH_3)_6$, the compound $As_4(NCH_3)_6[Ni(CO)_3]$ is obtained. The reactions are generally conducted at atmospheric pressure but superatmospheric or vacuum conditions may be desirable for specific starting materials.

The present process may be conducted without the use of a solvent. However, if it is desired to employ a solvent to promote the degree of mixing of the reagents and to improve the speed of quenching the reactants, various organic solvents may be employed, for example saturated hydrocarbons such as pentane, n-octane or dodecane or cyclohexane, ethers such as diethyl ether, or chlorocarbon solvents such as chloroform or carbon tetrachloride. The proportion of solvent is not critical. In the case of the crystalline products, a washing-filtration step serves to separate the crystals, other products and unreacted components. For example, the $P_4(NCH_3)_6[BH_3]_4$ crystals are washed with an inert solvent such as dry pentane. The present compounds are stable at low temperatures under an inert gas. The use of fractional crystallization is a useful method for the separation of the reaction products from the reaction mixture; this procedure is also useful for the separation of compounds having differing degrees of substitution. Other methods which may be used to isolate the products of the present invention include solvent extraction such as by the use of saturated hydrocarbons, e.g. pentane as the solvent.

Application of the law of mass action permits the preparation of one compound of this invention from another. For example, the reaction of the following equation is carried out in a few minutes at room temperature in an equal volume of chloroform:

$$P_4(NCH_3)_6[BH_3]_4 + P_4(NCH_3)_6 \rightarrow 2P_4(NCH_3)_6[BH_3]_2$$

The following examples illustrate specific embodiments of the present invention:

EXAMPLE 1

P, P', P'', P''' tetrakisnickeltricarbonyl (tetraphosphorus hexa-N-methylimide) is prepared as a crystalline species by mixing together 298 mg. (1 millimole) of phosphorustri-N-methylimide, $P_4(NCH_3)_6$, and 1 g. (6 millimoles) of liquid nickel carbonyl at room temperature under a nitrogen atmosphere.

It is found that carbon monoxide is evolved as a gas as substitution takes place upon the $P_4(NCH_3)_6$ core. When 4 moles of carbon monoxide per mole of the $P_4(NCH_3)_6$ have been evolved, the reaction is quenched by the use of a large excess of Dry-Ice-cooled dry pentane into which the crude crystalline product is crushed with agitation. A washing step is then employed using Dry-Ice-cooled, dry pentane to separate the insoluble product, from unreacted nickel carbonyl. The product is then filtered to obtain a white powder which is stable in air, but slowly decomposes with the evolution of carbon monoxide at 78° C. The product $P_4(NCH_3)_6[Ni(CO)_3]_4$ has the empirical formula $C_{18}H_{18}Ni_4O_{12}P_4$. The structure of the product is proven by the following:

(A) The proper elemental analysis;

(B) A partial structure determination based on the X-ray powder diffraction pattern (two moles per unit cell in the simple cubic system);

(C) The infra-red stretching frequencies for the carbonyl which are close to those of the $Ni(CO)_4$ itself; and (D) Additional structural evidence is obtained by following kinetically the formation of P, P', P'', P'''-tetrakistricarbonylnickel (tetraphosphorus hexa-N-methylimide) by $P^{31}$ NMR. In this case, all of the intermediate species having from 1 to 3 tricarbonylnickel groups per $P_4(NCH_3)_6$ molecule are observed to form and maximize successively. These intermediate compounds exhibit reasonable NMR chemical shifts and the correct peak areas for Ni—P bonding at the various P sites of $P_4(NCH_3)_6$. The NMR data for these intermediate compounds are present in Table I.

TABLE I

[$P^{31}$ NMR data for phosphorus-tri-N-methylimide/nickel tricarbonyl complexes]

| | | |
|---|---|---|
| $P_4(NCH_3)_6 \cdot 1\ Ni(CO)_3$ | −119.3 | −93.9 |
| $P_4(NCH_3)_6 \cdot 2\ Ni(CO)_3$ | −128.5 | −103.1 |
| $P_4(NCH_3)_6 \cdot 3\ Ni(CO)_3$ | −135.7 | −108.9 |

$P^{31}$ spectra measured in $CHCl_3$. Chemical shifts, δ in p.p.m., are referenced to 85% $H_3PO_4$, but are measured with respect to $P_4(NCH_3)_6$ at 82.7 p.p.m.

EXAMPLE 2

P, P', P'', P''',-tetrakisborane (tetraphosphorus-hexa-N-methylimide) is prepared by reacting together 1 g. (5 millimoles) of phosphorus tri-N-methylimide, $P_4(NCH_3)_6$, dissolved in 2 ml. of dry chloroform and 225 ml. (10 millimoles) of gaseous diborane at room temperature. The product is precipitated out as a crystalline white powder which is stable in air. The intermediate species having from one to three borane groups per $P_4(NCH_3)_6$ molecule are observed to form and maximize first. These intermediate compounds exhibit the correct NMR chemical shifts and peak areas.

TABLE II

[$P^{31}$ NMR data for phosphorus-tri-N-methylimide borane complexes]

| | δ coord. P | δ uncoord. P |
|---|---|---|
| $P_4(NCH_3)_6 \cdot 1\ BH_3$ | −80.5 | −103.2 |
| $P_4(NCH_3)_6 \cdot 2\ BH_3$ | −96.7 | −118.1 |
| $P_4(NCH_3)_6 \cdot 3\ BH_3$ | −110 | −112.6 |

EXAMPLE 3

A mixed metal complex is obtained when 4 millimoles of $P_4(NCH_3)_6$ are first reacted with 2 millimoles of $B_2H_6$, and 4 millimoles of $Ni(CO)_4$ at 25° C. and atmospheric pressure. The product has the structural formula:

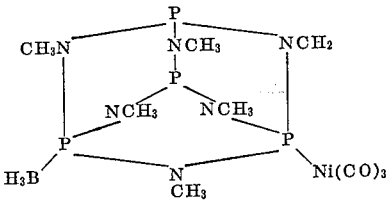

EXAMPLE 4

The compound having the empirical formula $P_4(NCH_3)_6\ Al(CH_3)_3$ is obtained by reacting 1 millimole of $P_4(NCH_3)_6$ with 1 millimole of $Al(CH_3)_3$ at room temperature at atmospheric presure.

EXAMPLE 5

The compounds having the empirical formula is obtained $P_4(NCH_3)_6\ Fe(CO)_4$ by reacting 1 millimole of $P_4(NCH_3)_6$ with 1 millimole of $Fe(CO)_5$ at 100° C. under atmospheric pressure.

EXAMPLE 6

P, P', P'', P'''-tetrakistricarbonylnickel (tetraarsenic hexa-N-methylimide) is prepared by mixing together 950 mg. (2 millimole) of $As_4(NCH_3)_6$ and 1.7 g. (10 millimoles) of liquid nickel carbonyl at room temperature, under a nitrogen atmosphere.

The compounds of the present invention have utility as gasoline additives to provide anti-knock activity and to inhibit the deposition of solid combustion residues in the cylnders of nternal combustion engines. For example, the compound $P_4(NCH_3)_6\ [Ni(CO)_3]_4$ is employed at a concentration of from 0.0001 to 1 gm. per gallon in a gasoline motor fuel to afford protection against misfiring surface ignition and solids deposition. Other fields of utility for the present compounds are as catalysts, for example, in the polymerization of olefinic monomers such as ethylene and propylene. The compounds of the invention are useful also as intermediates, in the preparation of other metallo-organic compounds, and as insecticides.

What is claimed is:

1. A compound having the formula:

$$Q_4(NR)_6[ML_a]_m[M'R'_b]_n$$

where Q is selected from the group consisting of phosphorus and arsenic; R is a hydrocarbyl radical of from 1 to 6 carbon atoms; M is at least one metal selected from the group consisting of nickel, cobalt, iron, manganese, chromium, vanadium, titanium, palladium, rhodium, ruthenium, molybdenum, platinum, iridium, osmium, rhenium and tungsten; L is a coordinating ligand selected from the group consisting of at least one of CO, $PF_3$, $PCl_3$, $PBr_3$, $PR''_3$, $P(OR'')_3$, $AsR''_3$, NCO, CN, unsaturated ligands, aryl ligands; R'' is a hydrocarbyl radical of from 1 to 20 carbon atoms; $a$ is a whole number from 1 to 6; $m$ is a whole number from 0 to 4; M' is at least one metal selected from the group consisting of beryllium, boron, aluminum, gallium, indium, and thallium; R' is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of R' substituents necessary to balance the valence of M'; and the symbol $n$ is a whole number from 0 to 4; and $n+m$ is a whole number from 1 to 4.

2. A compound having the formula:

$$Q_4(NCH_3)_6[ML_a]_m[M'R'_b]_n$$

where Q is selected from the group consisting of phosphorus and arsenic; M is at least one metal selected from the group consisting of nickel, cobalt, iron, manganese, chromium, vanadium, titanium, palladium, rhodium, ruthenium, molybdenum, platinum, iridium, osmium, rhenium and tungsten; L is a coordinating ligand selected from the group consisting of at least one of CO, $PF_3$, $PCl_3$, $PBr_3$, $PR''_3$, $P(OR'')_3$, $AsR''_3$, NCO, CN, unsaturated ligands, aryl ligands; R'' is a hydrocarbyl radical of from 1 to 20 carbon atoms; $a$ is a whole number from 1 to 6; $m$ is a whole number from 0 to 4; M' is at least one metal selected from the group consisting of beryllium, boron, aluminum, gallium, indium, and thallium; R' is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of R' substituents necessary to balance the valence of M'; and the symbol $n$ is a whole number from 0 to 4, and $n+m$ is a whole number from 1 to 4.

3. A compound having the formula:

$$P_4(NCH_3)_6[ML_a]_m[M'R'_b]_n$$

M is at least one metal selected from the group consisting of nickel, cobalt, iron, manganese, chromium, vanadium, titanium, palladium, rhodium, ruthenium, molybdenum, platinum, iridium, osmium, rhenium, and tungsten; L is a coordinating ligand selected from the group consisting of at least one of CO, $PF_3$, $PCl_3$, $PBr_3$, $PR''_3$, $P(OR'')_3$, $AsR''_3$, NCO, CN, unsaturated ligands, aryl ligands; R'' is a hydrocarbyl radical of from 1 to 20 carbon atoms; $a$ is a whole number from 1 to 6; $m$ is a whole number from 1 to 3; M' is at least one metal selected from the group consisting of beryllium boron, aluminum, gallium, indium, and thallium; R' is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of R' substituents necessary to balance the valence of M'; the symbol $n$ is a whole number from 1 to 3; $n+m$ is a whole number from 2 to 4.

4. A compound having the formula:

$$P_4(NCH_3)_6[ML_a]_m$$

where M is at least one metal selected from the group consisting of nickel, cobalt, iron, manganese, chromium, vanadium, titanium, palladium, rhodium, ruthenium molybdenum platinum, iridium, osmium, rhenium, and tungsten; L is a coordinating ligand selected from the group consisting of at least one of CO, $PF_3$, $PCl_3$, $PBr_3$, $PR''_3$, $P(OR'')_3$, $AsR''_3$, NCO, CN unsaturated ligands, aryl ligands; R'' is a hydrocarbyl radical of from 1 to 20 carbon atoms; $a$ is a whole number from 1 to 6; and $m$ is a whole number from 1 to 4.

5. A compound having the formula:

$$Q_4(NCH_3)_6[M(CO)_a]_m$$

where Q is selected from the group consisting of phosphorus and arsenic; M is at least one metal selected from the group consisting of nickel, cobalt, iron, and chromium; $a$ is a whole number from 1 to 6; and $m$ is a whole number from 1 to 4.

6. A compound having the formula:

$$P_4(NCH_3)_6[Ni(CO)_3]_m$$

where $m$ is a whole number from 1 to 4.

7. A compound having the formula:

$$P_4(NCH_3)_6[Ni(CO)_3]_4.$$

8. A compound having the formula:

$$As_4(NCH_3)_6[Ni(CO)_3]_m$$

where $m$ is a whole number from 1 to 4.

9. A compound having the formula:

$$As_4(NCH_3)_6[Ni(CO)_3]_4.$$

10. A compound having the formula:

$$P_4(NCH_3)_6[M'R'_b]_n$$

where M' is at least one metal selected from the group consisting of beryllium, boron, aluminum, gallium, indium, and thallium; R' is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of R' substituents necessary to balance the valence of M'; and the symbol $n$ is a whole number from 1 to 4.

11. A compound having the formula:

$$P_4(NCH_3)_6[BH_3]_n$$

where $n$ is a whole number from 1 to 4.

12. A compound having the formula:

$$P_4(NCH_3)_6[BH_3]_4.$$

13. A process for the preparation of a compound having the formula:

$$Q_4(NCH_3)_6[ML_a]_m[M'R'_b]_n$$

where Q is selected from the group consisting of phosphorus and arsenic; M is at least one metal selected from the group consisting of nickel, cobalt, iron, manganese, chromium, vanadium, titanium, palladium, rhodium, ruthenium, molybdenum, platinum, iridium, osmium rhenium, and tungsten; L is a coordinating ligand selected from the group consisting of at least one of CO, $PF_3$, $PCl_3$, $PBr_3$, $PR''_3$, $P(OR'')_3$, $AsR''_3$, NCO, CN, unsaturated ligands, aryl ligands; R'' is a hydrocarbyl radical of from 1 to 20 carbon atoms; $a$ is a whole number from 1 to 6; $m$ is a whole number from 0 to 4; M' is at least one metal selected from the group consisting of beryllium, boron, aluminum, gallium, indium and thallium; R' is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of R' substituents necessary to balance the valence of M'; and the symbol $n$ is a whole number from 0 to 4; and $n+m$ is a whole number from 1 to 4, the said process comprising admixing together approximately one molecular proportion of $Q_4(NCH_3)_6$ together with approximately $m$ molecular proportions of a compound selected from the group consisting of $ML_{a+1}$ and precursors of $ML_{a+1}$, and with approximately $n$ molecular proportions of a compound selected from the group consisting of $M'R'_b$ and precursors of $M'R'_b$.

14. A process for the preparation of a compound having the formula:

$$P_4(NCH_3)_6[ML_a]_m[M'R'_b]_n$$

where M is at least one metal selected from the group consisting of nickel, cobalt, iron, manganese, chromium, vanadium, titanium, palladium, rhodium, ruthenium, molybdenum, platinum, iridium, osmium, rhenium, and tungsten; L is a coordinating ligand selected from the group consisting of at least one of CO, $PF_3$, $PCl_3$, $PBr_3$, $PR''_3$, $P(OR'')_3$, $AsR''_3$, NCO, CN, unsaturated ligands, aryl ligands; R'' is a hydrocarbyl radical of from 1 to 20 carbon atoms; $a$ is a whole number from 1 to 6; $m$ is a whole number from 0 to 4; M' is at least one metal selected from the group consisting of beryllium, boron, aluminum, gallium, indium and thallium; R' is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of R' substituents necessary to balance the valence of M'; and the symbol $n$ is a whole number from 0 to 4; and $n+m$ is a whole number from 1 to 4, the said process comprising admixing together approximately one molecular proportion of $$P_4(NCH_3)_6$$

together with approximately $m$ molecular proportions of a compound selected from the group consisting of $ML_{a+1}$ and precursors of $ML_{a+1}$, and with approximately $n$ molecular proportions of a compound selected from the group consisting of $M'R'_b$ and precursors of $M'R'_b$.

15. A process for the preparation of a compound having the formula:

$$Q_4(NCH_3)_6[ML_a]_m$$

where Q is selected from the group consisting of phosphorus and arsenic; M is at least one metal selected from the group consisting nickel, cobalt, iron, maganese, chromium, vanadium, titanium, palladium, rhodium, ruthenium, molybdenum, platinum, iridium, osmium, rhenium, and tnugsten; L is a coordinating likand selected from the group consisting of at least one of CO, $PF_3$, $PCl_3$, $PBr_3$, $PR''_3$, $P(OR'')_3$, $AsR''_3$, NCO, CN, unsaturated ligands, aryl ligands; $R''$ is a hydrocarbyl radical of from 1 to 20 carbon atoms; $a$ is a whole number from 1 to 6; $m$ is a whole number from 1 to 4; the said process comprising admixing together approximately one molecular proportion of $Q_4(NCH_3)_6$ together with approximately $m$ molecular proportions of a compound selected from the group consisting of $ML_{a+1}$ and precursors of $ML_{a+1}$.

16. A process for the preparation of a compound having the formula:

$$Q_4(NCH_3)_6[M(CO)_a]_m$$

where Q is selected from the group consisting of phosphorus and arsenic; M is at least one metal selected from the group consisting of nickel, cobalt, iron, manganese, chromium, vanadium, titanium, palladium, rhodium, ruthenium, molybdenum, platinum, iridium, osmium, rhenium, and tungsten; $a$ is a whole number from 1 to 6; $m$ is a whole number from 1 to 4; the said process comprising admixing together approximately one molecular proportion of $Q_4(NCH_3)_6$ together with approximately $m$ molecular proportions of a compound selected from the group consisting of $M(CO)_{a+1}$ and precursors of $$M(CO)_{a+1}$$

17. A process for the preparation of a compound having the formula:

$$P_4(NCH_3)_6[Ni(CO)_3]_m$$

where $m$ is a whole number from 1 to 4; the said process comprising admixing together approximately one molecular proportion of $P_4(NCH_3)_6$ together with approximately $m$ molecular proportions of a compound selected from the group consisting of $Ni(CO)_4$.

18. A process for the preparation of a compound having the formula:

$$P_4(NCH_3)_6[Ni(CO)_3]_4$$

the said process comprising admixing together approximately one molecular proportion of $P_4(NCH_3)_6$ together with approximately 4 molecular proportions of $Ni(CO)_4$.

19. A process for the preparation of a compound having the formula:

$$As_4(NCH_3)_6[Ni(CO)_3]_m$$

where $m$ is a whole number from 1 to 4, the said process comprising admixing together approximately one molecular proportion of $As_4(NCH_3)_6$ together with approximately $m$ molecular proportions of $Ni(CO)_4$.

20. A process for the prepartion of a compound having the formula:

$$As_4(NCH_3)_6[Ni(CO)_3]_4$$

the said process comprising admixing together approximately one molecular proportion of $As_4(NCH_3)_6$ together with approximately 4 molecular proportions of $Ni(CO)_4$.

21. A process for the preparation of a compound having the formula:

$$P_4(NCH_3)_6[M'R'_b]_n$$

where $M'$ is at least one metal selected from the group consisting of beryllium, boron, aluminum, gallium, indium and thallium; $R'$ is at least one substituent of the metal, and is selected from the group consisting of hydrogen, a halogen, hydrocarbyl radicals of from 1 to 20 carbon atoms; alkoxyl radicals of from 1 to 20 carbon atoms; aroxyl radicals of from 7 to 20 carbon atoms; $b$ represents the number of $R'$ substituents necessary to balance the valence of $M'$; and the symbol $n$ is a whole number from 1 to 4; the said process comprising admixing together approximately one molecular proportion of $$P_4(NCH_3)_6$$

together with approximately $n$ molecular proportions of a compound selected from the group consisting of $M'R'_b$ and precursors of $M'R'_b$.

22. A process for the preparation of a compound having the formula:

$$P_4(NCH_3)_6[BH_3]_n$$

where $n$ is a whole number from 1 to 4; the said process comprising admixing together approximately one molecular proportion of $P_4(NCH_3)_6$ together with approximately $n/2$ molecular proportions of $B_2H_6$.

23. A process for the preparation of a compound having the formula:

$$P_4(NCH_3)_6[BH_3]_4$$

the said process comprising admixing together approximately one molecular proportion of $P_4(NCH_3)_6$ together with approximately two molecular proportions of $B_2H_6$.

References Cited

UNITED STATES PATENTS 3,350,435   10/1967   Van Wazer et al. _____ 260—440

OTHER REFERENCES

Holmes et al.: J. Am. Chem. Soc., 82 (1960), pp. 5509–10.
Holmes: J. Am. Chem. Soc., 83 (1961), pp. 1334–6.
Riess et al.: J. Am. Chem. Soc., 87 (1965), pp. 5506–7.

HELEN M. McCARTHY, *Primary Examiner.*

A. P. DEMERS, *Assistant Examiner.*

U.S. Cl. X.R.

44—68, 76; 252—386, 431; 260—429, 429.5, 438.5, 440, 441, 448, 462, 543, 551, 665, 999

PO-1050
(5/69)

UNITED STATES PATENT OFFICE
CERTIFICATE OF CORRECTION

Patent No. 3,420,864  Dated January 7, 1969

Inventor(s)  Jean G. Riess et al

It is certified that error appears in the above-identified patent and that said Letters Patent are hereby corrected as shown below:

Column 1, line 30, the formula "$O_4(NR)_6[ML_a]_m[M'R'_b]_n$" should read -- $O_4(NR)_6[ML_a]_m[M'R'_b]_n$ --.

Column 1, line 39, the word "carbon" at the beginning line should be omitted.

Column 1, line 46, the word "vandaium" should be -- vanadium --.

Column 4, line 69, the words "of thep resent" should b -- of the present --.

Column 5, line 69, in the structural formula on the ri hand side the formula "$NCH_2$" should be -- $NCH_3$ --.

Column 6, line 5, the word "presure" should be -- pres sure --.

Column 6, line 8, the word "compounds" should be -- compound --.

Column 6, line 22, the word "nternal" should be -- internal --.

Column 7, lines 35/36, the group of words "ruthenium m bdenum platinum," should be -- ruthenium, molybdenum, platinum,--.

Column 9, line 9, the word "tnugsten;" should be -- tungsten; --.

Column 9, line 9, the word "likand" should be -- ligan

Column 10, line 1, the word "prepartion" should be -- preparation --.

SIGNED AND
SEALED
JUN 23 1970

(SEAL)
Attest:

Edward M. Fletcher, Jr.

WILLIAM E. SCHUYLER, JI